March 23, 1965  G. H. RAWCLIFFE  3,175,141
POLE-CHANGING SYSTEM FOR THE D.C. FIELD WINDING
ROTARY ELECTRIC MACHINES Filed Jan. 27, 1961  2 Sheets-Sheet 1

INVENTOR
Gordon Hindle Rawcliffe
BY
Stevens, Davis, Miller & Mosher
ATTORNEY

March 23, 1965   G. H. RAWCLIFFE   3,175,141
POLE-CHANGING SYSTEM FOR THE D.C. FIELD WINDING
ROTARY ELECTRIC MACHINES
Filed Jan. 27, 1961   2 Sheets-Sheet 2
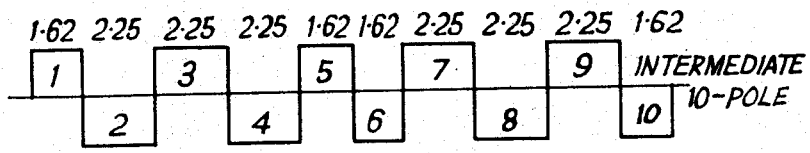
Fig.4a.
Fig.4b.
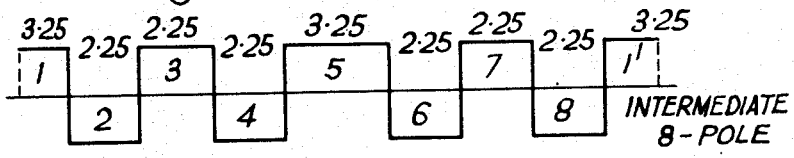
Fig.5a.
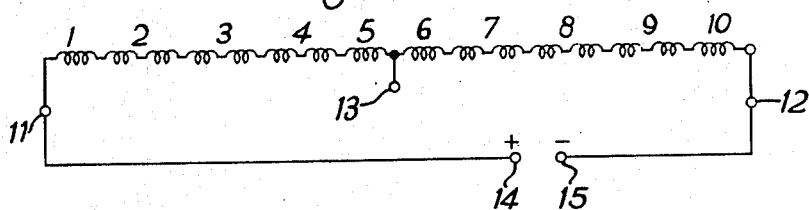
Fig.5b.
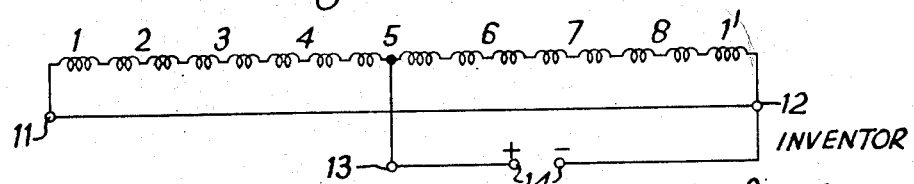
INVENTOR
Gordon Hindle Rawcliffe
BY
Stevens, Davis, Miller & Mosher
ATTORNEYS

United States Patent Office 3,175,141
Patented Mar. 23, 1965

3,175,141
POLE-CHANGING SYSTEM FOR THE D.C. FIELD WINDING ROTARY ELECTRIC MACHINES
Gordon Hindle Rawcliffe, Clifton, Bristol, England, assignor to National Research Development Corporation, London, England
Filed Jan. 27, 1961, Ser. No. 85,257
Claims priority, application Great Britain, Feb. 26, 1960, 6,821/60
5 Claims. (Cl. 318—173)

This invention relates to pole-changing A.C. synchronous machines having a pole-changing A.C. winding, particularly a three-phase winding, and a pole-changing, salient-pole D.C. field winding, both A.C. and D.C. windings providing alternative first and second pole-numbers by switching. The invention provides an improved pole-changing, salient-pole D.C. field winding for such machines.

The art of salient-pole D.C. field systems is well established. The construction of salient poles upon a rotor, the provision of energizing coils thereon, the supply of energizing current and switching of coils through sliprings and the determination of magnetic pole-width according to the dimensioning of pole-shoes upon the salient poles may be ascertained from standard textbooks on the subject. The present invention is concerned with variation of pole-width between the various poles of pole-changing field systems. The teachings of the present invention may accordingly be applied by established techniques to derive the novel structures of the invention.

For clarity, the invention will be particularly described in relation to salient-pole D.C. field systems, providing alternatively 10-poles and 8-poles by way of example.

In a normal phantom-pole system for this pole-combination, the original field-system is a regular 10-pole salient-pole arrangement of standard type. To change the field system to proivde 8-poles, the field coils on poles Nos. 5 and 10, numbered consecutively from an arbitrary origin, are cut out of circuit and are, usually, short-circuited on themselves. The field coils Nos. 6 to 9 inclusive are reversed with respect to the field coils Nos. 1 to 4 inclusive.

Figure 1A:
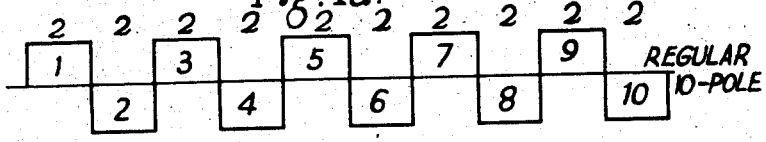
Figure 1B:
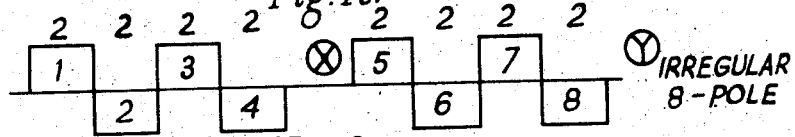

Such an arrangement is shown in FIGS. 1a and 1b of the accompanying drawings, in which FIG. 1a shows the waveform, that is, the number of poles, the pole-width and the pole-spacing, provided by the regular 10-pole connection and FIG. 1b shows the waveform, that is, the number of poles, the pole-width and the pole-spacing, provided by the modified, and irregular, 8-pole connection.

In FIGS. 1a and 1b, and in the further figures to be described, the consecutive number of each pole is represented by the reference number enclosed by the rectangles representing the poles and the relative pole-widths, and hence the pole-spacing, are represented by the figures appearing above the poles.

It can be shown that the arrangement of FIG. 1b results in a field-form mainly composed of 8 poles and 12 poles mixed. The magnitude of the undesired pole-number, that is 12 poles, is about three-quarters of the magnitude of the desired pole-number, that is 8 poles. Further, at the two points X and Y, at which the field coils of poles 5 and 10, FIG. 1a, are disconnected from circuit, there is necessarily no magnetic pull. This means that across two (rotating) diameters at right angles there are, alternately, a heavy magnetic pull and zero magnetic pull. This discontinuity tends to set up a 2-node traveling wave of distortion around the stator frame.

The amplitude of the desired 8-pole wave, for a given field current, is only about 80% of the amplitude of the original 10-pole wave. This value cannot even be improved by increasing the field current, because, in effect, the iron is already saturated by a large, but undesired, 12-pole flux.

The object of the present invention is to provide a rotating electric machine having an improved field system providing alternative pole numbers.

According to the present invention, a rotating electric machine has a field winding providing alternative first and second pole numbers, by reversal of current flow in one part of the field winding relatively to the direction of current flow in another part thereof, with or without the omission from circuit of parts of the field winding, the pole-widths of the poles developed varying from one to another for both the first and the second pole-numbers, the ratio between the pole-widths of any two successive poles, for both the first and the second pole numbers, being always less than 2:1.

The known field windings for providing alternative pole numbers provide a regular pole-width and pole-spacing distribution for one of the pole numbers and for the other pole number there is great variation of pole-widths and pole-spacings, usually in the ratio 2:1. For the pole-number with varied pole-widths and pole-spacings, the harmonic content is large.

A field winding arrangement as disclosed in the present invention differs from known arrangements in that the pole widths are irregular for both pole numbers. There is consequently a harmonic content for both pole-numbers but it is small for both. In practice, this is preferable to the known alternative of no harmonic content at one pole number and a large harmonic content at the other.

Preferably, a field-winding according to the invention is arranged so that the change from one alternative pole-number to the other is effected by the reversal of current flow in one half of the field winding relatively to the direction of current flow in the other half, without the omission of any part thereof.

Figure 2A:
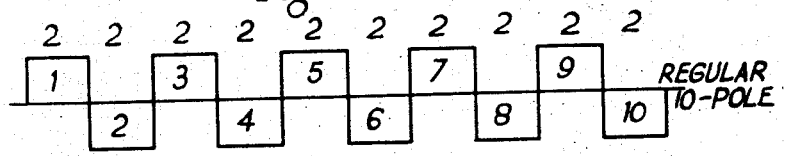
Figure 2B:
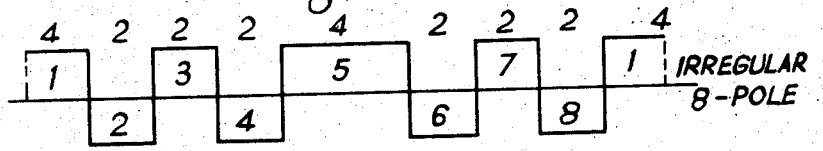
Figure 3A:
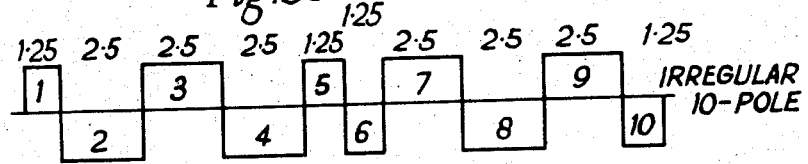
Figure 3B:
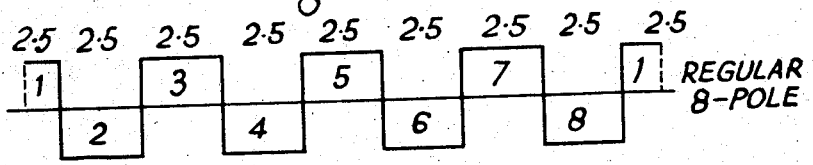

In order that the invention may readily be carried into effect, one embodiment, showing again a D.C. field system providing alternatively 10-poles and 8-poles will now be described more fully, by way of example, with reference to the further accompanying drawings, in which:

FIGS. 2a and 2b show a field ararngement providing alternatively a regular 10-pole field and an irregular 8-pole field, not an embodiment of the invention;

FIGS. 3a and 3b show a field arrangement providing alternatively an irregular 10-pole field and a regular 8-pole field, not an embodiment of the invention;

FIGS. 4a and 4b show a field arrangement according to the present invention; and FIGS. 5a and 5b are a field winding circuit diagram showing one manner of alternative connection of the coils to provide the pole arrangements of FIGS. 4a and 4b.

It will be evident to one skilled in the art that the accompanying FIGS. 1a, 1b, 2a, 2b, 3a, 3b, 4a and 4b represent developed diagrams of the circumferential magnetic field around the axis of the relevant field system and furthermore define the structure of the relevant field system in that the greater pole-number of each example defines the number of salient poles of the structure; the diagram portions above and below the reference line define the relative sense of energizing current flow in the windings of the salient poles, and the reference numbers applied to the poles define both the width of the respective pole-shoes and the angular spacing of consecutive pole-centers. The sense of energizing current flow for the inventive embodiment of FIGS. 4a, 4b is additionally shown in the circuit diagrams of FIGS. 5a, 5b.

The effect of the present invention is to vary the widths of the poles and their angular disposition around the axis of the machine. When rotating, the poles pass an arbitrary fixed point on the stator of the machine for unequal time durations and at unequal time intervals.

Variation of the widths of the poles may be provided in a pole-changing D.C. field system, for one or other of the alternative pole numbers, in a manner which does not achieve the object of the present invention and to which, consequently, the scope of the present invention does not extend. Two such arrangements are shown in FIGS. 2a, 2b and in FIGS. 3a 3b.

The former of these two arrangements provides a regular 10-pole field, the waveform of which is shown in FIG. 2a. It will be noted that both pole-width and pole-spacing are regular.

In the corresponding 8-pole connection, the waveform of which is shown in FIG. 2b, two pairs of consecutive uniformly-spaced salient pole members are energized in the same sense as each other. In consequence, the pole-width of pole 5 and of pole 1—1 is double that of the remaining six poles.

In contrast, the arrangement of FIGS. 3a, 3b provides poles of uniform pole-width and uniform spacing in the 8-pole arrangement, as shown by FIG. 3b, by eenergizing in the same sense two pairs of consecutive, closely-spaced salient pole members.

In the corresponding 10-pole connection, as shown in FIG. 3a, neither the pole width nor the pole-spacing is uniform, two consecutive poles 5 and 6 and two consecutive poles 10 and 1 occupying the space of any one of the remaining six poles.

In contrast with the two arrangements last described above the arrangement according to the invention shown in FIGS. 4a and 4b provides non-uniform pole-widths and non-uniform pole-spacing for both the alternative pole-numbers.

In the 10-pole connection, the waveform of which is shown in FIG. 4a, the pole-widths and pole-spacing of the six poles 2 to 4 and 7 to 9 inclusive is uniform but has a value intermediate those of the correspondingly numbered poles in the ararngements of FIGS. 2a and b and of FIG. 3a and b. The pole-width of the four poles 1, 5, 6, and 10 is less than that of the six poles first mentioned and has a value intermediate those of the correspondingly-numbered poles in the arrangements of FIG. 2a and of FIG. 3a.

In the 8-pole connection, the waveform of which is shown in FIG. 4b, the second half of the field winding is reversed relatively to the first half. This operation combines the opposite poles 5, 6 and 10, 1 of FIG. 4a to form, each, a single pole of double pole-width. This double pole-width has a value intermediate that of the correspondingly-numbered poles in the arrangements of FIG. 2b and of FIG. 3b.

The interconnection of the coils of the field winding is shown in FIGS. 5a and 5b. In the FIGS. 5a and 5b the coils are numbered correspondingly to the poles shown in FIGS. 4a and 4b respectively. In FIG. 5a, the coils are series-connected between end terminals 11 and 12, which are connected respectively to the terminals 14 and 15 of a D.C. supply. The centre tap terminal 13 is unused.

In FIG. 5b, the terminal 11 and 12 are connected together and to terminal 15 of the D.C. supply. The centre tap terminal 13 is connected to the other terminal of the D.C. supply.

The series connection is shown in FIG. 5a as corresponding to the 10-pole arrangement of FIG. 1a and the parallel connection of FIG. 5b is shown as corresponding to the 8-pole arrangement of FIG. 4b. By reversal of the winding sense of the coils 6 to 10 inclusive, the 10-pole arrangement can be provided by the parallel connection and the 8-pole arrangement by the series connection.

Both the pole arrangements of FIG. 4a and of FIG. 4b are irregular, but the harmonic content of neither is so great as for the irregular arrangements of FIG. 1b, FIG. 2b, or FIG. 3a.

It is not essential to use the pole-width values shown in FIGS. 4a and 4b, provided that the irregularity between the 8-pole and the 10-pole connection is divided between the two, to give pole-widths intermediate between the values for a regular winding. The values shown are preferred, however, for the alternative pole-numbers exemplified, because the ratio 2.25:1.62 is approximately equal to the ratio 3.25:2.25. That is, the three pole-widths which relate to the field winding ararngement, in its connections for both pole-numbers, form a geometrical series.

The first advantage of a D.C. field system as shown in FIGS. 4a and 4b is the considerable reduction of harmonic content, compared with the irregular connection of the three arrangements of the earlier figures.

A second advantage is that the field coils are fully effective for both pole-numbers. That is, the ability to change the pole-number does not have to be purchased at the price of a substantial reduction in the amplitude of the main flux corresponding to a given field excitation.

A third advantage is that the scheme involves no constructional difficulties in the machine. The circuit arrangement providing four slip rings for changing the pole-number, is very simple.

A further advantage, compared with conventional phantom-pole arrangements, is the avoidance of the magnetic field discontinuity, resulting in the stator frame distorting wave, referred to earlier herein.

D.C. field waveforms of the form shown in the accompanying drawings can be considered as determined, as to pole-width, by the width of the pole-shoes of a particular machine and, as to pole-spacing, by the angular positions of the centres of the pole-shoes around the axis of the machine. It is not essential for the size and position of the bodies of the poles to conform with those of the pole-shoes to achieve the stated waveforms.

It is therefore, possible in some practical cases, to provide a field system according to the invention solely by the dimensions and positions of the pole-shoes, the pole-bodies being uniformly dimensioned and uniformly spaced.

The field waveforms shown in the drawings are diagrammatic only. In practical machines, the shapes of the poles are normally adjusted, in ways known to those skilled in the art, to give approximately a sinusoidal waveform. Similarly, the exact sizes, shaping and positions of the pole-shoes in a field system according to this invention can readily be determined in an analogous fashion and discussion of the details of such procedures is not necessary for a clear understanding of the invention.

A field winding according to the present invention may advantageously be combined, in a rotating electric machine, with an armature winding providing alternative pole-numbers by the method of pole-amplitude modulation. This method of pole-changing is explained and exemplified in the co-pending patent application Serial No. 116,742.

I claim:

1. For a pole-changing A.C. synchronous machine having an A.C. winding providing alternative first and second number of poles, a salient-pole, D.C. field winding providing said first and second number of poles by reversal of current flow in one part of the field winding relatively to the direction of current flow in another part of the field winding, the pole-widths of the poles developed varying from one to another for both the first and the second numbers of poles, the ratio between the pole-widths of any two successive poles, for both the first and the second numbers of poles, being always less than 2:1.

2. A salient-pole D.C. field winding as claimed in claim 1, having a field winding providing alternative first and second numbers of poles by reversal of current flow in one half of the field winding relatively to the other half thereof.

3. A salient-pole D.C. field winding as claimed in claim 2, having a field winding providing a higher number of pole wherein a plurality of first poles are of equal width relatively to each other and a plurality of second poles are of smaller width relatively to said first poles and a lower number of pole wherein a plurality of first poles correspond in width to said first poles of the higher number of pole and a plurality of third poles are of great width relatively to said first poles, the ratio of widths of said first and second poles and the ratio of widths of said third and first poles both being approximately 1.4:1.

4. A salient-pole D.C. field winding as claimed in claim 3, having a field winding wherein the coils thereof providing each of said third poles alternatively provides two of said first poles by the reversal of current flow in one half thereof relatively to the other half thereof.

5. A salient-pole D.C. field winding as claimed in claim 4, having a field winding whereby the widths of said first and second poles are related in the ratio 2.5:1.62 and the widths of said first and third poles are related in the ratio 2.5:3.25.

References Cited by the Examiner

UNITED STATES PATENTS

| Re. 18,811 | 5/33 | Alger | 318—173 |
| 1,091,614 | 3/14 | Alexanderson | 310—188 |
| 1,491,451 | 4/24 | Wieseman | 318—173 |
| 1,752,871 | 4/30 | Wieseman | 318—173 |
| 3,049,653 | 8/62 | Rawcliffe | 318—173 |

FOREIGN PATENTS 969,462  6/58  Germany.

JOHN F. COUCH, *Primary Examiner.*

MILTON O. HIRSHFIELD, *Examiner.*